United States Patent
Wardlow (12)

(10) Patent No.: US 10,271,006 B1
(45) Date of Patent: Apr. 23, 2019

(54) MANUALLY CONTROLLED CONCURRENT DATA RECORDING AND PLAYBACK MACHINE

(71) Applicant: William Glenn Wardlow, Bend, OR (US)

(72) Inventor: William Glenn Wardlow, Bend, OR (US)

( * ) Notice: Subject to any disclaimer, the term of this patent is extended or adjusted under 35 U.S.C. 154(b) by 189 days.

(21) Appl. No.: 15/591,108

(22) Filed: May 10, 2017

(51) Int. Cl.
*H04N 5/91* (2006.01)
*H04N 5/765* (2006.01)

(52) U.S. Cl.
CPC .............. *H04N 5/91* (2013.01); *H04N 5/765* (2013.01)

(58) Field of Classification Search
USPC ................................ 369/30.02; 704/270–272
See application file for complete search history.

(56) References Cited

U.S. PATENT DOCUMENTS

| 5,161,199 | A | * | 11/1992 | David | ...................... | G11C 7/16 |
| | | | | | | 434/167 |
| 9,165,546 | B2 | * | 10/2015 | Setoguchi | ............... | G06F 17/00 |
| 9,286,872 | B2 | * | 3/2016 | Packouz | ................ | G10H 3/186 |

OTHER PUBLICATIONS

Tc electronic, Ditto X2 Looper English Manual, Nov. 20, 2014 (Year: 2014).*

\* cited by examiner

*Primary Examiner* — Daniel Swerdlow

(57) ABSTRACT

An novel method of manually controlling concurrent audio data recording and playback machines using an electromechanical momentary switch, an electronic device capable of detecting changes in the state of said electromechanical momentary switch, an audio data recording device, and an audio data playback device, whereby said electronic device will, upon detecting each change of state in said electromechanical momentary switch, cause said audio data recording device to stop recording the current audio data sample and start recording a new audio data sample, and cause said audio data playback device to play back the audio data sample whose recording was just stopped.

11 Claims, 4 Drawing Sheets

MANUALLY CONTROLLED CONCURRENT DATA RECORDING AND PLAYBACK MACHINE

BACKGROUND

This application relates to manually controlled concurrent data recording and playback machines, and a novel method of triggering said concurrent data recording and playback.

Concurrent data recording and playback machines are commonly used to record and later play back audio data, and are known as "looper" and/or "delay" effects. In both cases, audio data can be recorded and different, previously recorded audio data played back simultaneously.

Delay effects continually delay the playback of recorded audio by a fixed time interval resulting in a "repeat" of the audio.

Looper effects record a sample of audio then play that sample back one or more times. While looper effects allow concurrent recording and playback of distinct audio samples, no loopers, nor any other devices, allow a user to repeatedly alternately play back and record separate audio data samples using a single switch, let alone trigger those operations via each change of state of said switch.

The present invention allows concurrent alternating recording and playback of distinct data samples triggered by each change of state of an electromechanical momentary switch, resulting in a novel effect.

The improvements provided by the present invention are that it allows a far more efficient, intuitive, natural, and rhythmically flexible method of creating a "delay" type effect that is not tied to a fixed time interval.

The present invention takes advantage of both states of said electromechanical momentary switch to start and stop the recording of distinct data samples, and to initiate playback of the data sample just recorded. Upon each change of state of said electromechanical momentary switch (upon a press and again upon release), the recording of a current data sample is stopped, the recording of a new data sample is initiated, and the data sample whose recording was just stopped begins to play.

This is particularly helpful in the context of a musical performance where the music is being played live and a musician wishes to synchronize the recording and playback of his or her audio with the sounds created by the other human accompanists whose timing is inherently variable. The ability to manually control the recording and playback of audio in such an efficient and natural manner makes it simple for said musician to adjust to a shifting and dynamic tempo.

DRAWINGS

Figure 1:
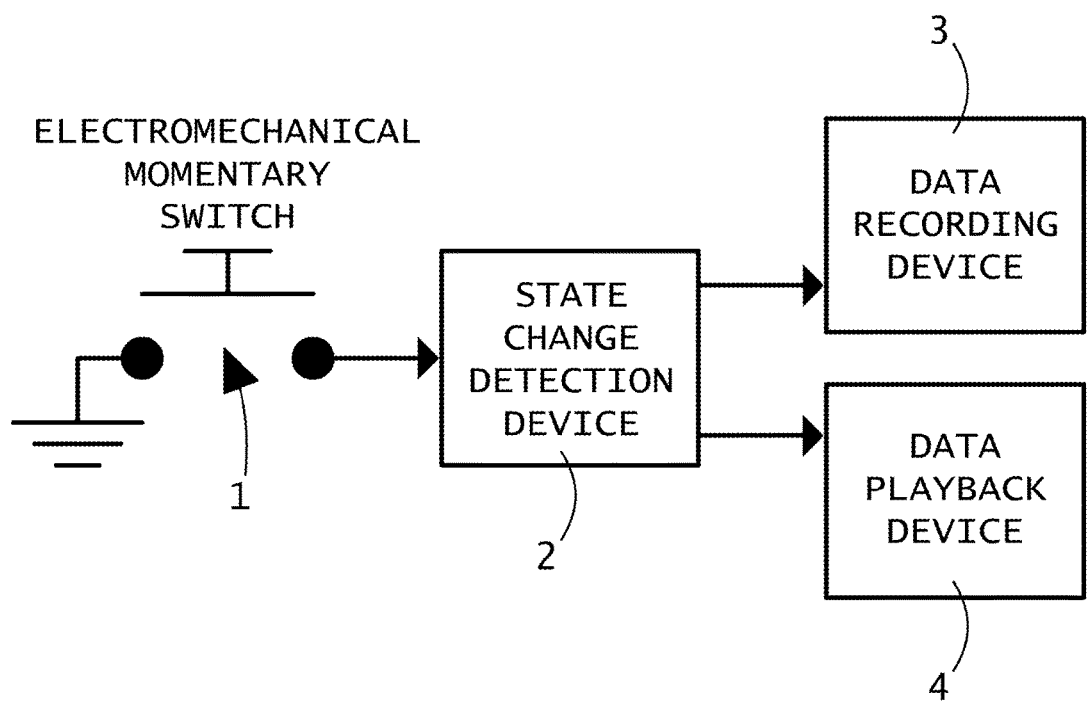

FIG. 1 illustrates an electromechanical momentary switch (1), any change in the state of which is detected by a state change detection device (2), which, upon detecting such state change, causes a data recording device (3) to stop recording the current data sample and start recording a new data sample, and causes a data playback device (4) to play back the data sample whose recording was just stopped. Note that said electromechanical momentary switch need not necessarily be connected to electronic ground, so long as the connection allows detection of changes in state.

Figure 2:
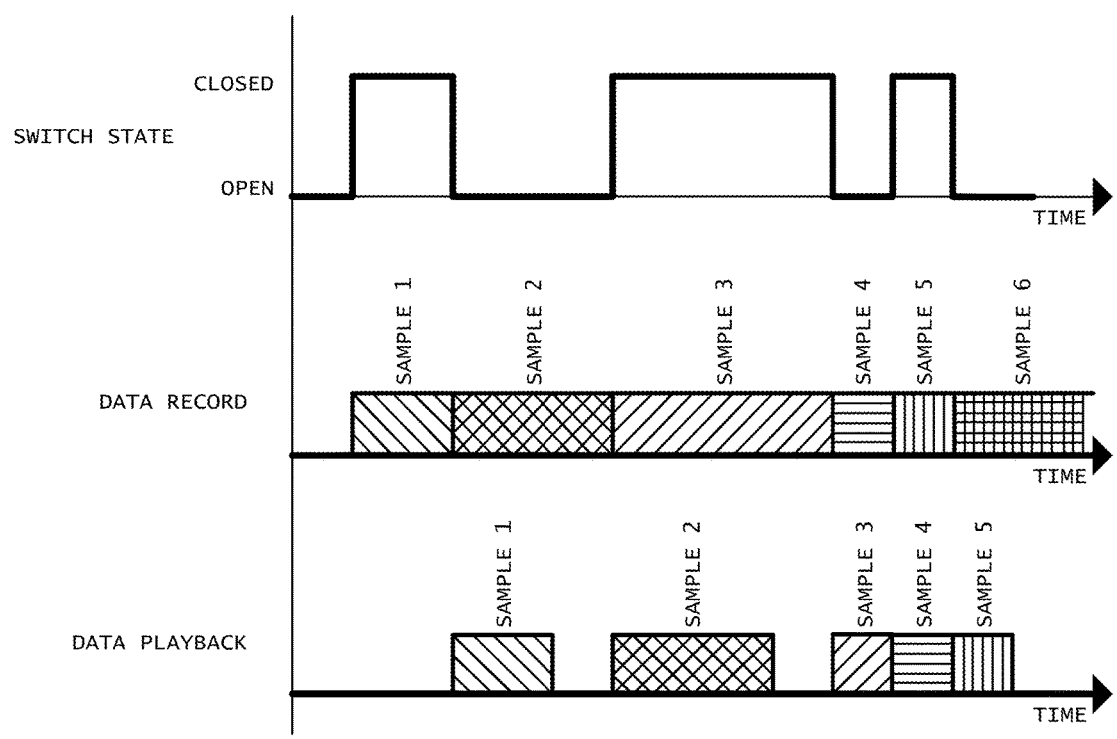

FIG. 2 illustrates the relationship between the state of said electromechanical momentary switch and the states of said data recording device and said data playback device, whereby each change in the state of said electromechanical momentary switch causes said data recording device to stop recording the current data sample and start recording a new data sample, and causes said data playback device to play back the data sample whose recording was just stopped.

Figure 3:
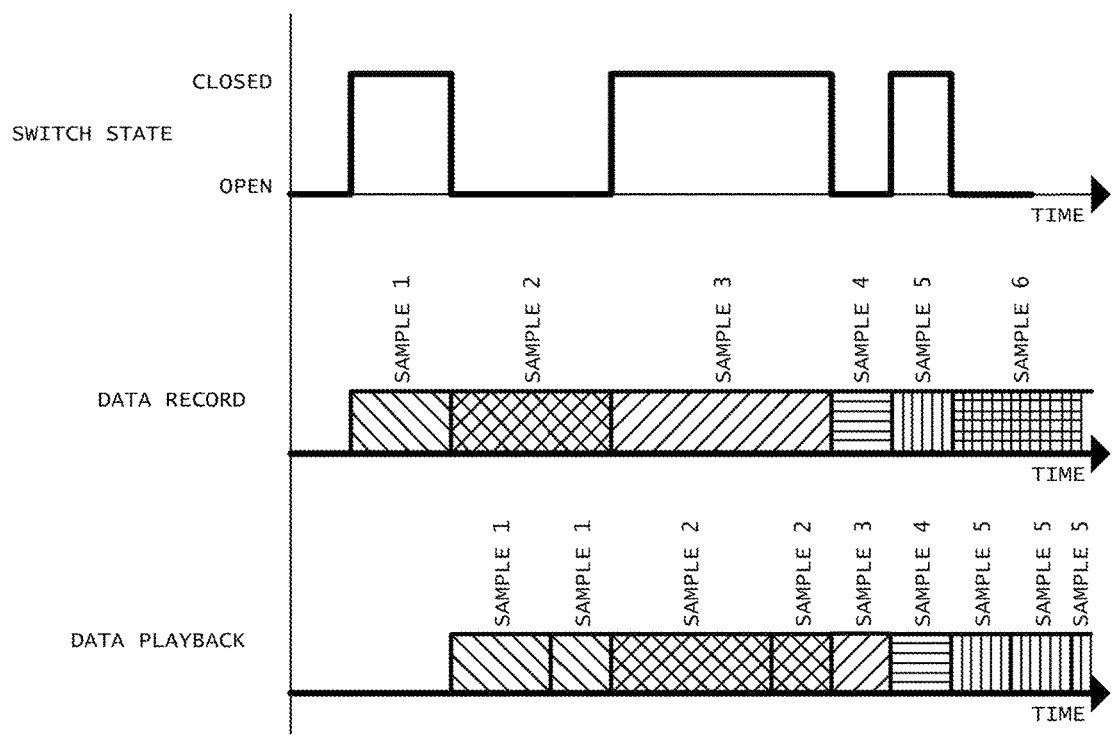

FIG. 3 illustrates one variation of said manually controlled concurrent data recording and playback machine whereby said data playback device, upon reaching the end of playback for a recorded audio data sample prior to a new change of state in said electromechanical momentary switch, begins playing back said audio data sample again.

Figure 4:
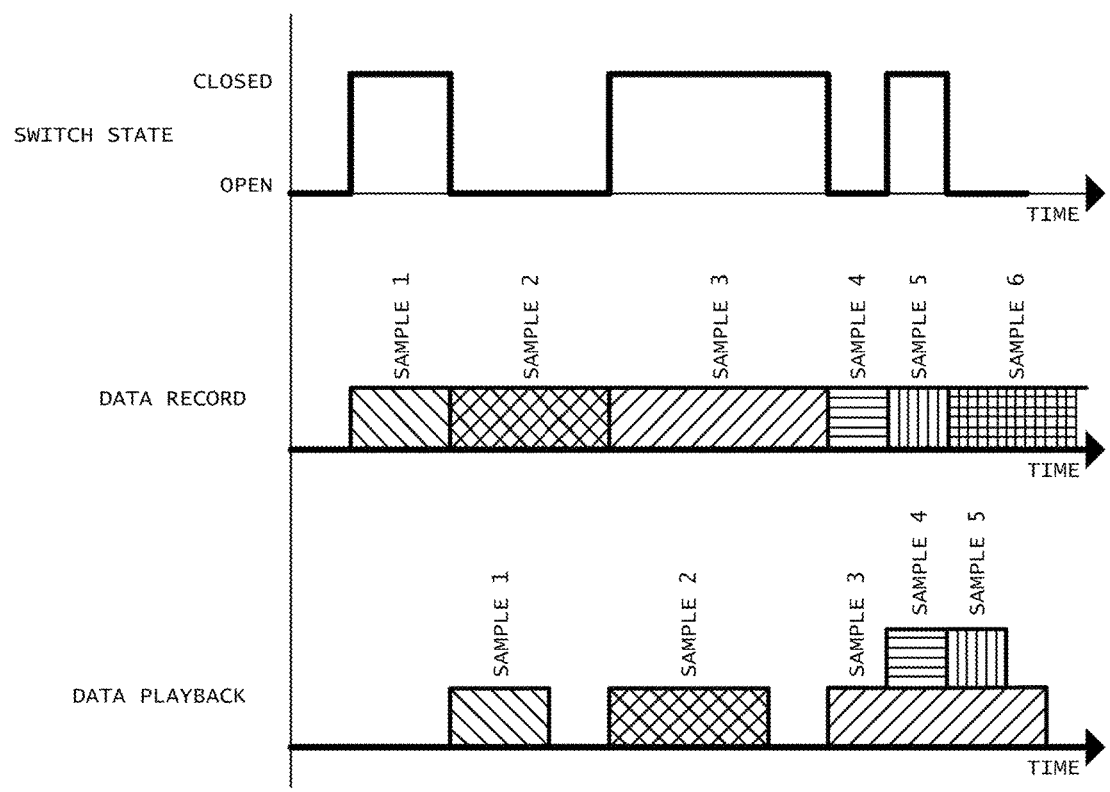

FIG. 4 illustrates one variation of said manually controlled concurrent data recording and playback machine whereby said data audio playback device, prior to reaching the end of playback for a recorded audio data sample and upon detecting a new change of state in said electromechanical momentary switch, continues playing back the current audio data sample and also begins concurrently playing back the audio data sample whose recording was just stopped.

DETAILED DESCRIPTION—INITIAL COMMERCIAL EMBODIMENT

The Initial Commercial Embodiment of the present invention uses a spring-loaded normally-open single-throw momentary contact electromechanical footswitch (hereinafter "Momentary Footswitch"). A normally closed momentary footswitch is equally suitable for purposes of the Initial Commercial Embodiment.

One terminal of said Momentary Footswitch is connected to electrical ground and the other terminal is interfaced with an input pin on a pre-programmed General Purpose Data Processor Of A Known Type (hereinafter "Processor").

Because the contacts on said Momentary Footswitch physically bounce when they change states, an electrical circuit which filters out switch bounce exists between said Momentary Footswitch and the input pin on said Processor.

When said Momentary Footswitch is open, said input pin is high (positive voltage).

When said Momentary Footswitch is closed, said input pin is grounded.

Said Processor periodically reads the input pin voltage and turns the reading into a binary value (0 for ground, 1 for positive voltage). Said binary value is a numerical representation of the state of said Momentary Footswitch.

Said Processor is capable of detecting the open or closed state of said Momentary Footswitch, storing said state in memory, and detecting each change in the state of said Momentary Footswitch by comparing the current state to the state stored in memory.

The Initial Commercial Embodiment of the present invention also uses a data recording device as well as a data playback device, both of which also reside on said Processor.

During normal operation, said Processor periodically checks the state of said Momentary Footswitch and compares it to the state stored in memory. If the current state of said Momentary Footswitch has changed from the state stored in memory, said Processor causes said data recording device to stop recording the current data sample and start recording a new data sample, and causes said data playback device to play back the data sample whose recording was just stopped.

The Initial Commercial Embodiment allows the user to select whether said data playback device will, prior to a change of state in said Momentary Footswitch, repeat a data sample that has already reached its end (as shown in FIG. 3), or whether it will stop playing a data sample that has reached its end (as shown in FIG. 2).

The Initial Commercial Embodiment allows the user to select whether said data playback device will, upon a change of state in said Momentary Footswitch, continue playing a data sample that has not yet reached the end together with the data sample whose recording was just stopped (as shown in FIG. 4), or whether it will stop playing the current unfinished data sample and start playing the data sample whose recording was just stopped (as shown in FIG. 2).

The Initial Commercial Embodiment blends the audio data playback with the audio that is currently being recorded, resulting in a unique, musically pleasing "delay" type effect that is not tied to a fixed time interval.

The Initial Commercial Embodiment allows the user to select whether the first data sample begins recording upon the initial press of said Momentary Footswitch or upon detection of incoming data by said Processor.

The Initial Commercial Embodiment allows the recording device to "time out" after a certain amount of time. When this happens, recording is stopped and the recorded data is cleared from memory, allowing a fresh start the next time the device is triggered.

Unlike existing concurrent data recording and playback machines, a musician need not adjust his or her playing to a fixed time interval, but can continuously vary the interval by which the playback is delayed, as well as the length of the audio sample recorded, using a single electromechanical momentary switch.

The improvements provided by the present invention are that it allows a far more efficient, intuitive, natural, and rhythmically flexible method of creating a "delay" type effect that is not tied to a fixed time interval.

ALTERNATE FEATURES/EMBODIMENTS

Switch Bounce

Said Processor used in the Initial Commercial Embodiment is programmed to ignore switch state changes that result from switch bounce.

Although the Initial Commercial Embodiment uses both electronic circuitry and additional lines of program code to eliminate the effects of switch bounce, it should be noted that there exist other types of switches which do not suffer from switch bounce, such as optical interrupter switches, and which may not require said additional electronic circuitry and/or lines of code.

Switch Types

Potential embodiments of the present invention include, but are in no way limited to, those using the following alternative types of switches and switch interfaces:
  Optical sensor
  Optical interrupter
  Proximity sensor
  Variable Resistance The key factors are that the switch has at least two distinct states, can be physically actuated, and is momentary in nature (it returns to its previous state when not being actuated).

Further, multiple switches could be used, as long as they are actuated in a manner consistent with a single momentary switch (for example using two side-by-side switches where one switch is actuated on a press, and a different switch is actuated upon release).

Interrupt on Change

Many microcontrollers and computer chips are able to generate a program interrupt when the state of an input pin is changed. Potential embodiments of the present invention may wait for such an interrupt, rather than periodically checking the state of said switch.

Physical Embodiment

The device embodying the present invention can be comprised of separate components, or may be completely self-contained in a single unit, or any combination thereof.

Said electronic device detecting the switch state change may be physically separate from said data recording device and said data playback device as long as all the components are electronically interfaced. For example, in one potential embodiment of the present invention, said electromechanical momentary switch and said electronic device capable of detecting each change of state in said electromechanical momentary switch may be interfaced wirelessly. In another potential embodiment, said data recording device and said data playback device may be interfaced wirelessly.

The present invention could easily employ more than one data recording device and/or more than one data playback device without altering its fundamental nature.

Moreover, the use of multiple data recording and/or data playback devices may allow simultaneous playback of multiple data samples. Simultaneous playback of data samples could also be achieved by merging data on said Processor.

Further, said data recording device and said data playback device need not reside on a processor, and may be analog in nature.

Data Storage

Various types of data storage devices can be used. Potential embodiments include, but are in no way limited to the following:
  Computer Memory
  Magnetic Tape
  Switching arrays
  Shift registers (digital and/or mechanical)
  Optical media
  Visual representations Memory regions need not be fixed, and may be dynamically allocated.

Data Types

Data may be recorded and played back within said Processor and used internally and/or interfaced with additional circuitry and other devices and components.

Potential embodiments of the present invention include, but are not limited to, those whose data comprises:
  Numeric data values
  Computer data and data sets
  Control Voltages
  Switching Arrays
  Variable Resistances
  Optical Output
  Pulse-Width Modulation
  Various Wireless Protocols While the Initial Commercial Embodiment is designed to record and play back audio data, the present invention may be used to record and play back countless other data types wherever manual control of data recording and playback is desired, including, but not limited to numeric data for lighting controls, video data, gain controls, switching networks, electromechanical devices, software, robotics, and automation, to name only a few.

Transitions Between Playback of Data Samples

Potential embodiments of the present invention include the use of interim and/or interpolated values to create smooth transitions between different data samples, thereby avoiding abrupt changes in values. Such transitions may be linear, exponential, or calculated as a result of an algorithm. Such transitions may be programmable or follow pre-defined, or user-defined patterns and/or algorithms.

Relative Data Sample Interval

One potential embodiment of the present invention may not be limited to data samples corresponding to the interval between switch presses, but may calculate a relative time interval based thereon, for example ten percent longer.

Data Feedback

One potential embodiment of the present invention may send output data (or an altered version thereof) back to the input, thereby allowing further repeats of said output data (or altered output data).

Initial Triggers

One potential embodiment of the present invention may allow data recording to initially begin upon detection of a data signal rather than waiting for an initial press of the electromechanical momentary switch.

Other methods of initiating data recording could include an external control signal or initial data packet.

Recording Timeout

One potential embodiment of the present invention may allow said data recording device to time out after when a change of state in said electromechanical momentary switch fails to occur within a certain amount of time. The timeout interval may be set by the user or be pre-defined. When the recording device times out, recording will stop and recorded data may be cleared from memory, allowing a fresh start the next time the device is triggered.

CONCLUSIONS, RAMIFICATIONS, AND SCOPE

Thus the reader will see that at least one embodiment of the manually controlled concurrent data recording and playback machine provides a far more efficient, intuitive, natural, and rhythmically flexible method of creating a "delay" type effect that is not tied to a fixed time interval.

I claim:

1. A manually controlled concurrent data recording and playback machine comprising:
   a) an electromechanical momentary switch;
   b) an electronic device capable of detecting each change of state in said electromechanical momentary switch, from open to closed and vice versa;
   c) an audio data recording device; and
   d) an audio data playback device;
   whereby said electronic device will, upon detecting each change of state in said electromechanical momentary switch, cause said audio data recording device to stop recording a current audio data sample and start recording a new audio data sample, and cause said audio data playback device to play back the audio data sample whose recording was just stopped.

2. The manually controlled concurrent data recording and playback machine of claim 1, wherein said electromechanical momentary switch is in the form of a footswitch.

3. The manually controlled concurrent data recording and playback machine of claim 1, wherein said electromechanical momentary switch is interfaced wirelessly with said electronic device capable of detecting each change of state in said electromechanical momentary switch.

4. The manually controlled concurrent data recording and playback machine of claim 1, wherein said electronic device capable of detecting each change of state in said electromechanical momentary switch is interfaced wirelessly with said audio data recording device.

5. The manually controlled concurrent data recording and playback machine of claim 1, wherein said electronic device capable of detecting each change of state in said electromechanical momentary switch is interfaced wirelessly with said audio data playback device.

6. The manually controlled concurrent data recording and playback machine of claim 1, wherein said audio data recording device is interfaced wirelessly with said audio data playback device.

7. The manually controlled concurrent data recording and playback machine of claim 1, wherein said audio data playback device uses interim and/or interpolated values to create transitions when switching between audio data samples.

8. The manually controlled concurrent data recording and playback machine of claim 1, wherein the device embodying the present invention calculates a relative duration during which said audio data recording device is recording an audio data sample based on the interval between changes of state of said electromechanical momentary switch.

9. The manually controlled concurrent data recording and playback machine of claim 1, wherein the device embodying the present invention feeds playback data back to said audio data recording device.

10. The manually controlled concurrent data recording and playback machine of claim 1, whereby the device embodying the present invention, upon reaching the end of playback for a recorded audio data sample without yet detecting a new change of state in said electromechanical momentary switch, begins playing said audio data sample again.

11. The manually controlled concurrent data recording and playback machine of claim 1, whereby the device embodying the present invention, prior to reaching the end of playback for a recorded audio data sample and upon detecting a new change of state in said electromechanical momentary switch, continues playing back the current audio data sample and also begins concurrently playing back the audio data sample whose recording was just stopped.

* * * * *